PIEZO-ELECTRIC FILTER FOR COLOR OSCILLATOR SYNCHRONIZATION

Filed April 26, 1956 3 Sheets-Sheet 1

INVENTOR.
JOSEPH O. PREISIG
BY
[signature]
ATTORNEY

PIEZO-ELECTRIC FILTER FOR COLOR OSCILLATOR SYNCHRONIZATION

INVENTOR.
JOSEPH O. PREISIG
BY Olin Mitchell
ATTORNEY

Oct. 31, 1961 J. O. PREISIG 3,006,988

PIEZO-ELECTRIC FILTER FOR COLOR OSCILLATOR SYNCHRONIZATION

Filed April 26, 1956 3 Sheets-Sheet 3

INVENTOR.
JOSEPH O. PREISIG
BY
[signature]
ATTORNEY 3,006,988

PIEZO-ELECTRIC FILTER FOR COLOR OSCILLATOR SYNCHRONIZATION

Joseph O. Preisig, Trenton, N.J., assignor to Radio Corporation of America, a corporation of Delaware Filed Apr. 26, 1956, Ser. No. 580,747
6 Claims. (Cl. 178—5.4)

The present invention relates to an improved color oscillator circuit for use in a color television receiver.

In the present color television signal, both a luminance and a chrominance signal are transmitted. The luminance signal is a wide band brightness information signal. The chrominance signal is a modulated subcarrier containing modulations representative of various color difference signals. Color difference signals of the type R—Y, B—Y and G—Y, namely, red, blue and green, when individually added to the luminance or Y signal, produce component color signals R, B and G which are applied to a color image reproducer to produce a transmitted image.

Color difference signals are demodulated from the chrominance signal by synchronous demodulation, that is, by heterodyning or sampling the chrominance signal at phases corresponding to the color difference signals desired. In order to make synchronous demodulation possible in a circuit remote from a broadcast transmitter, color synchronizing bursts of reference phase information are transmitted on the "back porch" of each horizontal synchronizing pulse in the color television signal. These color synchronizing bursts are used to synchronize a reference signal source to produce an output signal which has the frequency of the color subcarrier and a phase prescribed by the bursts. The output signal of the reference signal source is split into phases corresponding to the phases of the chrominance signal to be demodulated. These variously-phased demodulating signals are then used in a synchronous demodulator to provide demodulation of the desired color difference signals.

For color fidelity in a color television receiver, it is important that the reference signal source be accurately synchronized and maintained at a phase prescribed by the color synchronizing bursts. Such a reference signal source must be capable of maintaining phase synchronization throughout each scanning line following each color synchronizing burst. Also, since some noise may accompany the color synchronizing bursts, noise immunity of the reference signal source while subjected to phase synchronization, is highly desirable.

An important type of burst synchronized oscillator circuit used in color television receivers is the injection-lock type of oscillator wherein the color synchronizing bursts are applied to an oscillator control electrode and utilized to phase synchronize the oscillations of the oscillator. In an injection-lock type of oscillator, improved performance is obtained by utilizing the oscillator tank circuit to filter the color synchronizing bursts. Use of the tank circuit in such a manner provides lowest losses and optimum filtering of the color synchronizing bursts to thereupon yield optimum operation and greatest noise immunity of the oscillator. If the tank circuit includes a piezo-electric crystal, the stability of the oscillator will also be improved since piezo-electric crystals have a greater frequency stability and have less of a tendency to drift in frequency than corresponding circuits consisting of an inductance and a capacitor.

In many oscillators of the piezo-electric crystal type, the piezo-electric crystal must present an inductive impedance to the oscillator so that the feedback signal provided by capacitive circuitry will be of correct phase. However an injection locking signal, passed through the piezo-electric crystal in such oscillators, will experience minimum attenuation when frequency of the burst and the series resonant frequency of the piezo-electric crystal coincide. Thus, if the injection locking signal, injected into such as oscillator, is at the series resonance frequency of the crystal rather than at the free-running oscillator frequency, the frequencies of the locking signal and of the free-running oscillator will differ slightly and the oscillator will drop out of synchronization for weak signals and noise; this will result in color streaking and improper color rendition. In burst synchronized oscillators of the present invention, this frequency "drop out" is avoided by operating the piezo-electric crystal at series resonance.

It is an object of this invention to provide an improved piezo-electric crystal oscillator circuit for use as a demodulating signal generator in a color television receiver.

It is a further object of this invention to provide an improved burst-synchronized oscillator circuit wherein a piezo-electric crystal operates at series resonance and wherein the aforementioned crystal also serves to filter synchronizing signals.

It is a still further object of this invention to provide a burst-responsive injection-locked piezo-electric crystal oscillator.

According to one form of the invention, the burst-synchronized oscillator utilizes a tank circuit wherein a piezo-electric crystal is connected serially with a first and second reactance to form a closed loop. The first and second reactance in combination provide resonance at the frequency of the burst; the piezo-electric crystal in the loop circuit is series resonant at the burst frequency. An amplifier and feedback circuit coupled to the aforementioned loop and adapted to provide a feedback signal shifted in phase by 180°, will generate oscillations at the frequency of the crystal; at the frequency of series resonance of the crystal, the tank circuit may be arranged to present maximum impedance to the oscillator while presenting minimum impedance to any injection-lock signal applied to the amplifier and feedback circuit by way of the loop. Burst synchronization is achieved by injecting color synchronizing bursts through the piezo-electric crystal of the serially connected loop forming the tank circuit to the amplifier and feedback circuit; the piezo-electric crystal also filters the bursts to provide for noise-immune injection-locking of the oscillations developed by the oscillator in the loop circuit.

In one form of the present invention, neutralizing means are provided for neutralizing any burst sidebands passing through the parallel shunt capacity of the piezo-electric crystal.

Other and incidental objects of this invention will become apparent upon a reading of the following specification and a study of the drawings, where:

Figures 1, 2:
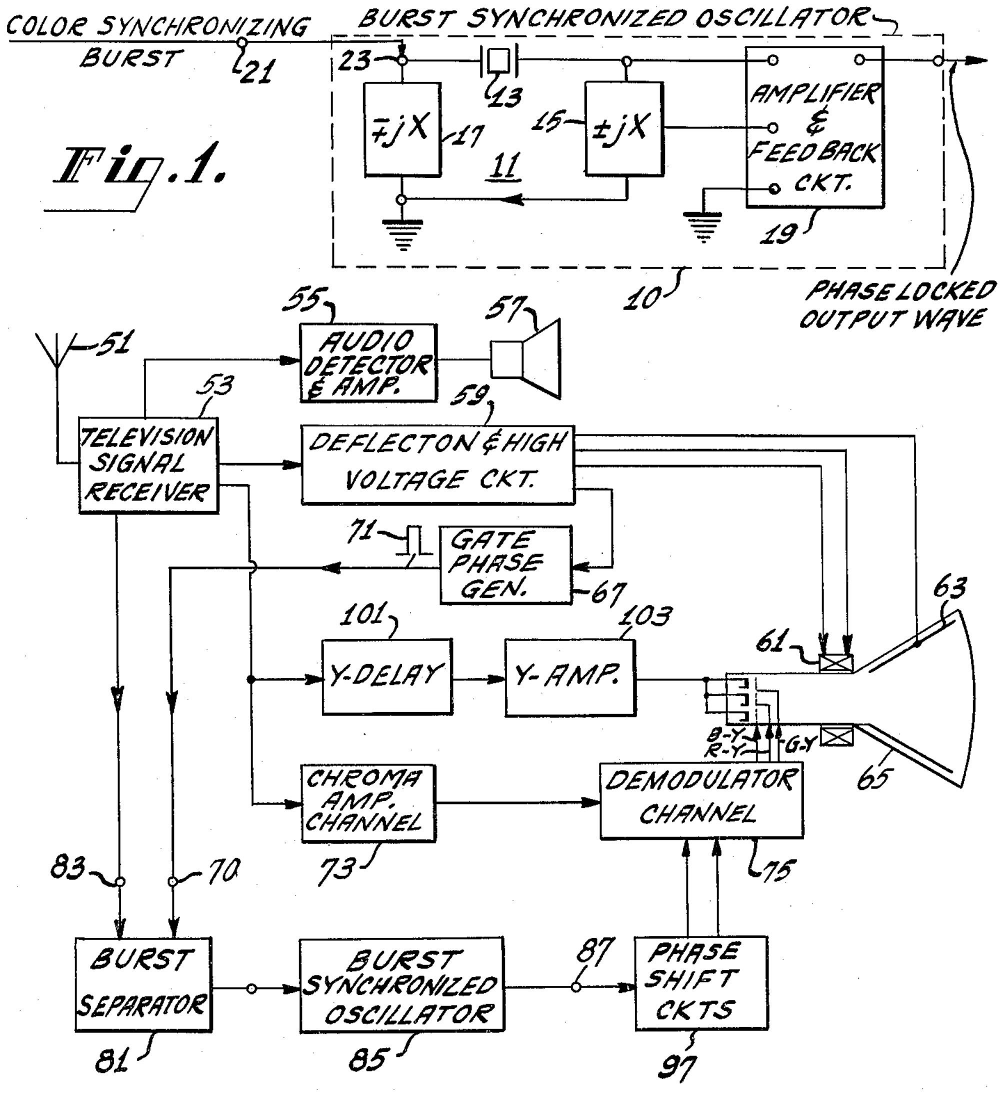
FIGURE 1 is a block diagram of one form of the present invention.
FIGURE 2 is a block diagram of a color television receiver.

One form of the burst synchronized oscillator 10 of the present invention is diagrammed in FIGURE 1. The burst synchronized oscillator employs a unique type of tank circuit 11 using, in one form of circuit, a series resonant loop including a piezo-electric crystal 13 which is connected serially with a pair of reactances 15 and 17. The piezo-electric crystal 13 is series resonant at the frequency of the color synchronizing bursts, namely, 3.58 mcs. If the reactance 15 is an inductive reactance (having a positive sign; that is, of the type $+jX$), then reactance 17 will be a capacitive reactance (having a negative sign; that is, of the form $-jX$); reactances 15 and 17 in combination provide resonance at the resonant frequency of the piezo-electric crystal 13. Alternatively, if the reactance 15 is a capacitive reactance, then reactance 17 will be an inductive reactance. Since the piezo-electric crystal 13 is tuned to series resonance, it represents substantially a short-circuit in the loop including the serially connected reactances 15 and 17. In this way, reactances 15 and 17 and piezo-electric crystal 13 form a resonant circuit tuned to the same frequency as the piezo-electric crystal 13.

An amplifier and feedback circuit 19 is coupled to the reactance 15 to develop a 180° out-of-phase signal which properly reapplied to the amplifier and feedback circuit 19 from the tank circuit 11, causes oscillations to be developed in the tank circuit 11, these oscillations being at the frequency of the piezo-electric crystal 13. The frequency of oscillation is therefore determined by the frequency of the series resonant piezo-electric crystal 13. In order to reduce the Q of the piezo-electric crystal 13 for phase stability reasons, one or more resistors can be connected in series with the piezo-electric crystal 13 or in parallel with the included reactances in the tank circuit 11. It is to be noted that the tank circuit does not require a high-Q piezo-electric crystal since the crystal is operated at its series resonant frequency and therefore at a frequency point of minimum attenuation. In this way, it is possible to use commercially manufactured low-Q crystals. One advantage of employing a low-Q crystal is that the piezo-electric crystal 13 does not have to be provided in a special socket.

The burst synchronized oscillator 10 can be injection-locked by injecting color synchronizing bursts from the terminal 21 into the tank circuit 11. One point of injection is the terminal 23 between the piezo-electric crystal 13 and the reactance 17. The color synchronizing bursts will thereupon pass through the piezo-electric crystal 13 and be injected therefrom into the amplifier and feedback circuit 19 to phase synchronize the oscillations developed in the tank circuit 11. The color synchronizing bursts, passing through the piezo-electric crystal 13, will be filtered by the crystal to eliminate burst sidebands and noise components and thereby cause the burst synchronized oscillator 10 to be relatively noise immune and to prevent this oscillator from phase-locking on sidebands of the intermittent color synchronizing bursts. It is to be appreciated that burst sidebands are developed because of the intermittent nature of the burst.

The arrangement for injecting color synchronizing bursts into the tank circuit 11 and the coupling of the amplifier and feedback circuit 19 to the tank circuit 11 as shown in FIGURE 1 is a typical but not necessarily definitive arrangement. Specific and alternative connections of various types of circuits comprising a burst synchronized oscillator 10 of the present invention will be described in the specification to follow.

Before considering detailed schematic diagrams illustrating alternative forms of the present invention, consider the operation of the color television receiver whose block diagram is shown in FIGURE 2. An incoming signal from a television broadcast transmitter is received at the antenna 51 and applied to the television signal receiver 53. The television signal receiver 53 providing first detection, intermediate frequency amplification and second detection, detects the television signal of the incoming wave. This television signal contains the chrominance signal and color synchronizing bursts when color transmission is involved.

The detected television signal includes a sound-modulated frequency-modulated carrier which is transmitted 4½ mcs. removed from the sound carrier. Using, for example, an intercarrier sound circuit, the audio detector and amplifier 55 demodulates the sound signal, amplifies the sound signal and applies the amplified sound signal to the loud speaker 57.

The television signal is applied to the deflection and high voltage circuits 59 which separate the picture synchronizing signals from the television signal, and develop therefrom horizontal and vertical deflection signals and a high voltage. The vertical and horizontal deflection signals are applied to the deflection yokes 61; the high voltage is applied to the ultor 63 of the color kinescope 65. The deflection and high voltage circuits 59 also energize the gate pulse generator 67 which produce both a pulse 71 at the terminal 70. The pulse 71 has a time duration substantially in coincidence with the color synchronizing bursts. The gate pulse generator 67 is usually included in the color television receiver in the form of an auxiliary winding on a high voltage transformer of the deflection and high voltage circuits 59.

The television signal is applied to the chroma amplifier channel 73 which separates the chrominance signal from the higher frequency band from the television signal. The chroma amplifier channel 73 also amplifies and applies the chrominance signal to the demodulator channel 75.

The television signal receiver 53 applies the detected color television signal to the burst separator 81 by way of terminal 83. The burst separator 81, responsive to the gate pulse 71, separates the color synchronizing bursts from the color television signal and applies the separated color synchronizing bursts to the burst synchronized oscillator and burst detector 85.

The burst synchronized oscillator and burst detector 85 is a circuit of the type shown in FIGURE 1. The burst synchronized oscillator and burst detector 85, responsive to the color synchronizing bursts, provides a phase-locked 3.58 mc. signal at the output terminal 87.

A demodulating signal from the burst synchronized detector 85 is applied by way of terminal 87 to the phase shift circuits 97. The phase shift circuits 97 provide demodulating signals of selected phases to the demodulator channel 75, which, responsive to the chrominance signal from the chroma amplifier channel 73 by way of terminal 99, demodulates the R—Y, B—Y and G—Y color difference signals; these color difference signals are in turn applied to corresponding control electrodes of the color kinescope 65.

The color television signal, which constitutes principally luminance information when not subjected to synchronous demodulation, is applied by way of the Y delay line 101 and the Y amplifier 103 to the cathodes of the color kinescope 65. Signal addition of the luminance or Y signal and each of the color difference signals provided by the demodulator channel 75 is performed within the color kinescope 65 to develop the televised image on the image face of that kinescope.

Figures 3, 4, 5, 6:
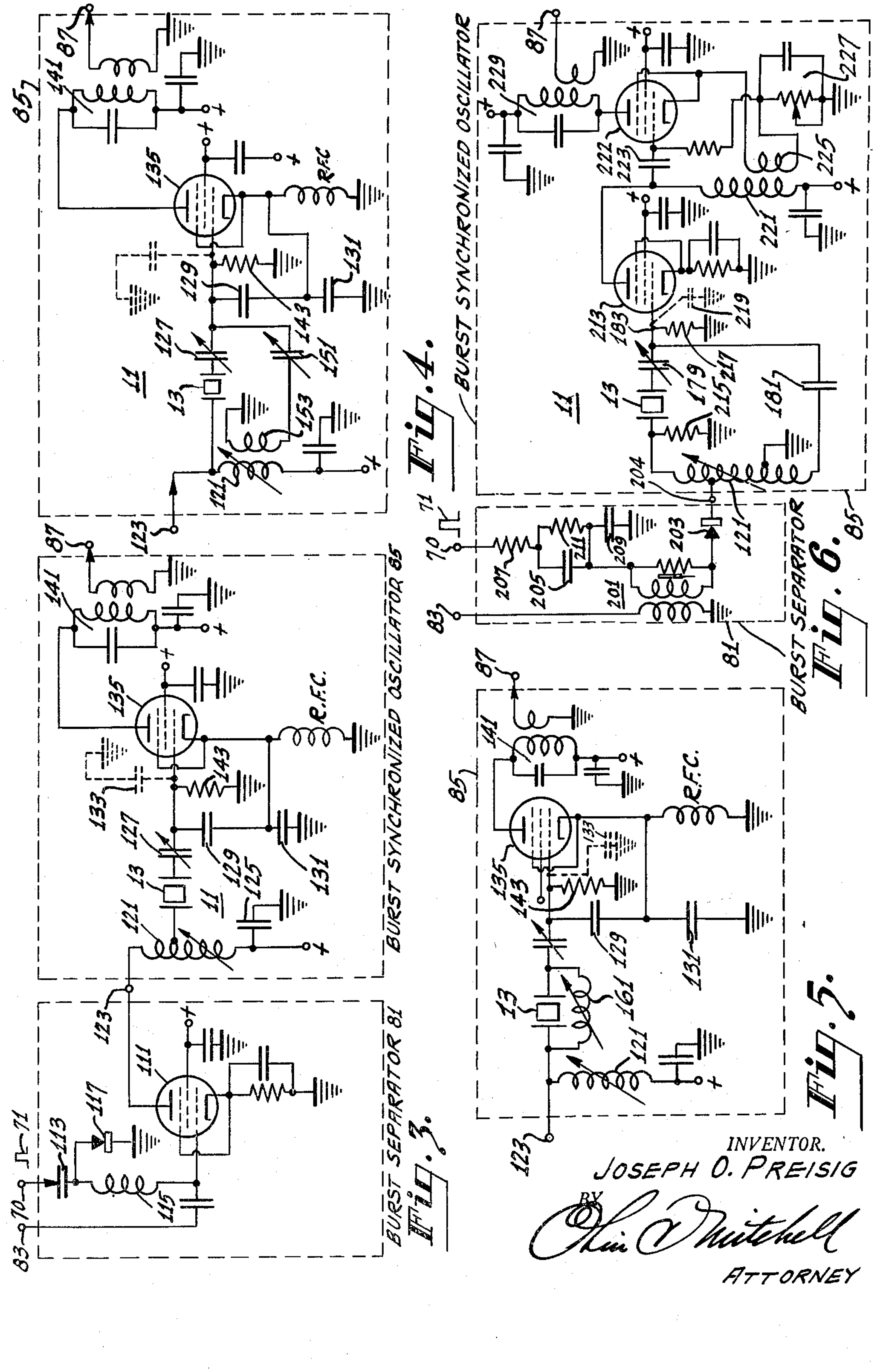
FIGURES 3 through 7 are schematic diagrams of color oscillators of the present invention.

FIGURE 3 is a schematic diagram of one form of the burst separator 81 and burst synchronized oscillator 85 of the color television receiver of FIGURE 2. The burst separator 81 employs a pentode 111. The color television signal is applied to the control grid of pentode 111 by way of terminal 83. The gate pulse 71 is applied by way of the condenser 113 and the radio frequency choke 115 to the control grid of pentode 111. The rectifier 117 is coupled from the connection between the condenser 113 and the radio frequency choke 115 to ground. The rectifier 117 serves to develop a clamped voltage at the control grid of pentode 111 responsive to the gate pulse 71 so that pentode 111 only conducts during each gate pulse 71. Since the color synchronizing bursts are developed at the control grid of pentode 111 during each gate pulse, the color synchronizing bursts are thereupon gated to the output load of this tube. In the particular embodiment shown, the output load of pentode 111 is the inductance 121 of the burst synchronized oscillator 85. The inductance 121 is connected to the a node of pentode 111 by way of terminal 123. A bypass condenser 125 bypasses the other end of inductance 121 to ground.

The burst synchronized oscillator 85 includes a tank circuit 11 comprising a group of serially connected parameters according to the present invention. A tank circuit 11 includes the inductance 121 in series with the piezo-electric crystal 13 which is in turn connected to the capacitance 127; capacitance 127 is not needed if the piezo-electric crystal is ground to series resonance. A condenser network made up of the serially connected condensers 131 and 129 in shunt with the grid-to-cathode capacitance 133 of tube 135 form a capacitive series member of the series loop of tank circuit 11. This capacitive series member is operative between the control grid of the tube 135 and ground. Since the B+ voltage terminal of inductance 121 is bypassed to ground by way of condenser 125, the series loop of the tank circuit 11 is thereby completed. The cathode of tube 135 is connected to the mid-connection of condensers 129 and 131 to provide a feedback circuit to the control grid of that tube. A radio frequency choke is also coupled between the cathode of tube 135 and ground to cause the potential of the cathode to vary in response to alternating current variations of current emitted from the cathode of tube 135. The feedback of alternating current energy from the cathode to the control grid of tube 135 by way of the tank circuit 11 causes oscillations to be developed in that tank circuit; these oscillations are thereupon developed in the plate load 141 of tube 135 and produced at the output terminal 87. A grid leak network for the control grid of tube 135 consists of the resistor 143 operating in conjunction with condensers 129 and 131. Resistor 143 may also be proportioned to provide suitable loading of the piezo-electric crystal 13 to increase stability of the burst synchronized oscillator 85. It is noted that the color synchronizing bursts developed across the inductance 121 of the tank circuit 11 pass through the piezo-electric crystal 13 and are filtered by that crystal. The filtered bursts thereupon flow through the variable condenser 127 and are developed at the control grid of tube 135 to injection-lock the oscillations developed in the tank circuit 11 at the phase and frequency prescribed by the filtered bursts.

FIGURE 4 shows another type of connection which can be used for neutralizing a burst synchronized oscillator 85 of the present invention. The tank circuit 11 includes the crystal 13 in series with the condensers 127, 129 and 131 as in the tank circuit 11 of FIGURE 3. The tank circuit 11 of FIGURE 4 also includes the neutralizing circuit 150 consisting of the condenser 151 and the inductance 153 which is inductively coupled to the inductance 121. The condenser 151 is connected to the control grid of the tube 135. The neutralizing circuit 150 provides for neutralization of any burst sidebands which may pass through the parallel capacitive impedance (due to the crystal holder) of the piezo-electric crystal 13 to the control grid of tube 135 of the burst synchronized oscillator 85. The phase locking of the oscillations developed in the tank circuit 11 will be at the phase of the burst.

The burst synchronized oscillator 85 of FIGURE 5 uses an inductance 161 coupled in shunt with the piezo-electric crystal 13. The inductance 161 is caused to resonate with the shunt capacity of the piezo-electric crystal 13, that is, the crystal holder capacity, so that in the vicinity of the frequency of the burst, the principal impedance of the crystal 13 and inductance 161 assembly will be the series-resonant impedance of the crystal 13; this impedance is very low and will shunt the impedance of the parallel resonant circuit made up of inductance 161 and the shunt capacity of the crystal 13. Thus, at the frequency of the burst, the crystal 13 will provide a very sharp pass band and minimum attenuation. In this way the filter characteristics of the crystal are enhanced and the crystal 13 is caused to filter the separated bursts and apply to the control grid of tube 135 a filtered signal wherein all adjacent sidebands are completely eliminated. By using circuits of the type shown in FIGURE 5, the crystal 13 does not have to be in a special socket and may have relatively low Q. In experimental circuits employing the present invention, crystals having wire leads of the type, similar to those employed wtih resistors, have been used with considerable success.

In the burst separator 81 of FIGURE 6, the chroma and burst are applied by way of terminal 83 to the resonant circuit 201 which is responsive to the frequency band normally occupied by the chrominance signal and the burst. The resonant circuit 201 is connected to the rectifier 203. The gate pulses 71 are coupled from terminal 70 by way of the resistance condenser network including the condenser 205, the resistor 207, the condenser 209 and the resistor 211 to the terminal of the rectifier 203 to which the resonant circuit 201 is applied. During the gate pulse 71, the rectifier 203 is caused to conduct thereby passing the burst, to the inductance 121. During intervals between the gate pulses 71, the resistor-condenser network through which the gate pulse 71 passes, develops a voltage at the rectifier 203 which prevents conduction through rectifier 203 between each gate pulse 71.

The burst synchronized oscilaltor 85 of FIGURE 6 involves a somewhat different circuit than that used for the corresponding circuits of FIGURES 3, 4, and 5. The separated burst is applied to the inductance 121. Inductance 121 is the inductance member of the series resonant tank circuit 11 which includes the crystal 13 and the condenser 179 and the grid-to-cathode capacitance 219 of tube 213. The tank circuit 11 is used here as a filter circuit for the burst and does not produce self induced oscillations. The tank circuit 11 filters the burst and applies the filtered burst, in the form of a continuous ringing signal, to the terminal 183. Terminal 183 is coupled to the control grid of tube 213 which functions as an amplifier tube. Resistors 215 and 217 provide proper loading of the crystal 175. Burst sidebands which pass through the shunt capacitance of the crystal 13 are neutralized by the out-of-phase burst information which is coupled from the terminal 180 of the inductance 121 through condenser 181 to the control grid of tube 213.

The filtered burst which is applied to the control grid of tube 213 is thereupon developed across the inductance 221 which resonates with the grid-to-cathode capacitance 224 of tube 222. The inductance 221 is connected by way of condenser 223 to the control grid of the oscillator tube 222. The cathode of tube 222 is inductively coupled to the inductance 221 by way of the coupling loop 225 in a manner whereby oscillations are developed in both the inductance 221 and also in the electron stream of tube 222. Both the control grid of tube 117 and the off-cathode terminal of the coupling loop 225 are connected to the grid leak circuit 227. The signals developed at the control grid of tube 222 will thereupon be a combination of both the oscillations developed by oscillator action in the resonator 221 and the filtered burst which is developed there by way of amplifier tube 213 and the condenser 223. The filtered burst, will therefore phase lock the oscillations developed by the circuit. The phase locked oscillations developed in the electron stream of tube 117 are developed across the output load 229 and therefrom at the output terminal 87.

Figure 7:
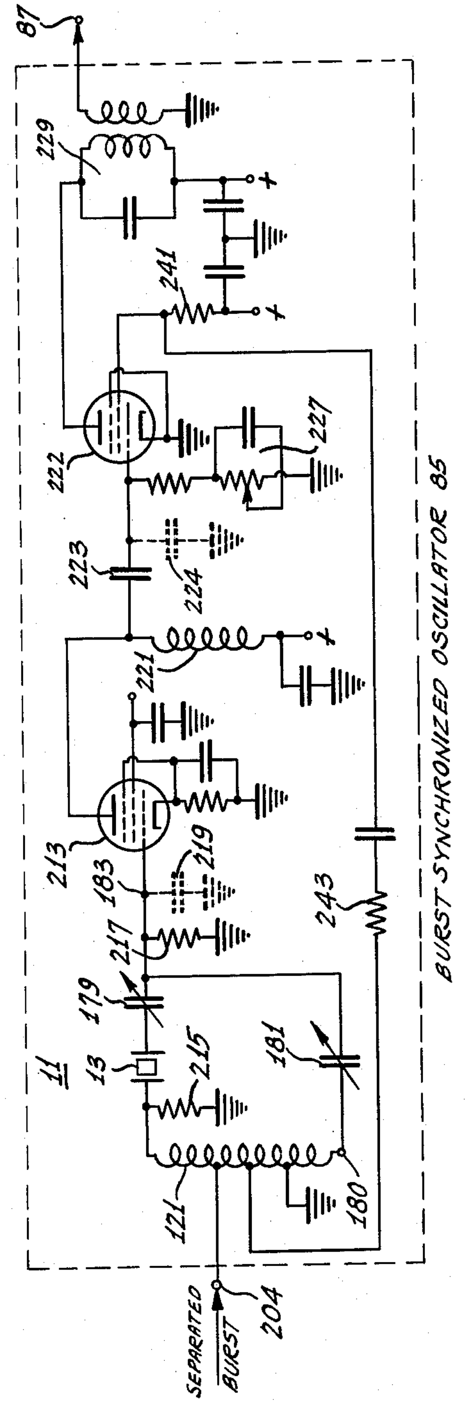

FIGURE 7 is a schematic diagram of a burst synchronized oscillator 85 which uses an oscillator feed circuit which is different from that used in the circuit of FIGURE 6. In the burst synchronized oscillator 85 of FIGURE 7, the oscillator feedback is obtained from a load impedance 241 which is coupled to the screen grid of tube 222; this feedback signal can alternatively be obtained from the resonant circuit 229, or from the cathode of tube 222 as shown in FIGURE 6. The feedback signal is attenuated to the proper amplitude level by the resistor 243 and coupled to the inductance 121 of tank circuit 11. The feedback signal will thereupon be filtered by tank circuit 11, amplified by tube 213 and caused to develop oscillations in the resonant circuit comprising the inductance 221 and the grid-to-cathode capacitance 224 of tube 222.

Having described the invention, what is claimed is:

1. In a color television receiver including a source of periodically recurring color synchronizing bursts, a burst synchronized oscillator comprising in combination a piezo-electric crystal tuned for series resonance at a frequency substantially equal to the frequency of said bursts, said crystal having an input terminal and an output terminal, first impedance means coupled between said input terminal and a point of reference potential, second impedance means coupled between said output terminal and said point of reference potential, said first impedance means presenting a reactance of one sign at the frequency of said bursts and said second impedance means presenting a reactance of the opposite sign at a frequency of said bursts, said first and second impedance means having reactance values such as to provide resonance at the frequency of said bursts, an amplifier device having an input electrode and an output electrode, means for coupling said crystal input terminal to said source of bursts, and means for coupling said crystal output terminal to said amplifier device input electrode whereby said crystal provides a low impedance, narrow band path for the passage of said bursts from said source to said input electrode, and a feedback path coupling said amplifier device output electrode to an intermediate point on said second impedance means.

2. In a color television receiver adapted to receive a color television signal including periodically recurring color synchronizing bursts of oscillations, and including means for separating said bursts from said composite television signal, a burst synchronized oscillator comprising the combination of a burst input terminal, means for applying the output of said burst separating means to said burst input terminal, an inductive impedance coupled between said burst input terminal and a point of reference potential, capacitance means having first and second end terminals and an intermediate terminal, means for coupling said first end terminal to a point of reference potential, an amplifier device having an input electrode and an output electrode, means for coupling said second end terminal to said input electrode, means providing a feedback path between said output electrode and said intermediate terminal, said inductive impedance and said capacitance means having values such as to provide resonance at the frequency of said bursts, and a piezo-electric crystal tuned for series resonance at the frequency of said bursts and coupled between said burst input terminal and said amplifier device input electrode whereby a low impedance, narrow band path for said bursts is provided between said burst source and said input electrode and whereby a relatively high impedance at the frequency of such bursts is presented between said burst input terminal and said point of reference potential and between said input electrode and said point of reference potential.

3. Apparatus in accordance with claim 2 wherein a second path, in addition to said low impedance, narrow band path via said crystal, is provided for said bursts between said burst separating means and said amplifier device input electrode, said second path comprising means for supplying the burst output of said separating means to said amplifier device input electrode in phase opposition to the burst output supplied to said amplifier device input electrode via said crystal.

4. Apparatus in accordance with claim 3 wherein said piezo-electric crystal has inherent shunt capacity whereby undesired sidebands of said synchronizing bursts may bypass the narrow band path provided by said crystal and arrive at said amplifier device input electrode, and wherein said second path comprises a capacitance having a predetermined value relative to said inherent shunt capacity such as to effectively neutralize the undesired burst sidebands passed to said amplifier device input electrode via said inherent shunt capacity.

5. In a color television receiver adapted to receive a color television signal including periodically recurring color synchronizing bursts of oscillations, and including means for separating said bursts from said composite television signal, a burst synchronized oscillator comprising the combination of an amplifier device having an input electrode and an output electrode, a tank circuit coupled between said input electrode and a point of reference potential, said tank circuit comprising a first series combination including a pair of serially connected capacitors, said first series combination being coupled between said input electrode and said point of reference potential, and a second series combination including a piezo-electric crystal in series with the output winding of a transformer, second said series combination, being connected in shunt with said first series combination, said piezo-electric crystal being series resonant at a frequency substantially equal to the frequency of said bursts of oscillations, the capacitance values of said pair of serially connected capacitors and the inductance value of said output winding being chosen such as to provide resonance at said frequency substantially equal to the frequency of said bursts, means for coupling the output of said burst separating means to an input winding of said transformer, and means for providing an oscillation-sustaining feedback path from said output electrode to the point of junction of said pair of serially connected capacitors.

6. Apparatus in accordance with claim 5 including an additional capacitance means, such additional capacitance means being coupled between said transformer and said input electrode for neutralizing undesired signal components passed from said burst separating means to said input electrode via said crystal.

References Cited in the file of this patent

UNITED STATES PATENTS

| | | |
|---|---|---|
| 2,740,046 | Tellier | Mar. 27, 1956 |
| 2,741,700 | Hall | Apr. 10, 1956 |
| 2,766,321 | Parker | Oct .9, 1956 |
| 2,776,334 | Goldberg | Jan. 1, 1957 |
| 2,837,594 | Clay | June 3, 1958 |
| 2,897,260 | Larky | July 28, 1959 |
| 2,910,657 | True | Oct. 27, 1959 |

OTHER REFERENCES

Handbook of Piezoelectric Xtals for Radio Equipment Designers; December 1954, pages 169 and 413 (Wright Air Development Center Report 54–248).

GE Color TV Receiver, facing inside rear cover of "Introduction to Color TV" by M. Kaufman and H. Thomas, John F. Rider Publisher, Inc., 480 Canal Street, New York 13, N.Y., TK 6670 K3 in Scientific Library.

Circuit Diagram, RCA, Model 21–CT–7835, Service Data 1956, No. T5, copy in Division 16.